Feb. 4, 1936.   R. E. WILSON   2,029,690
PROCESS AND APPARATUS FOR CONTACTING TWO LIQUIDS
Filed July 10, 1933   2 Sheets-Sheet 1
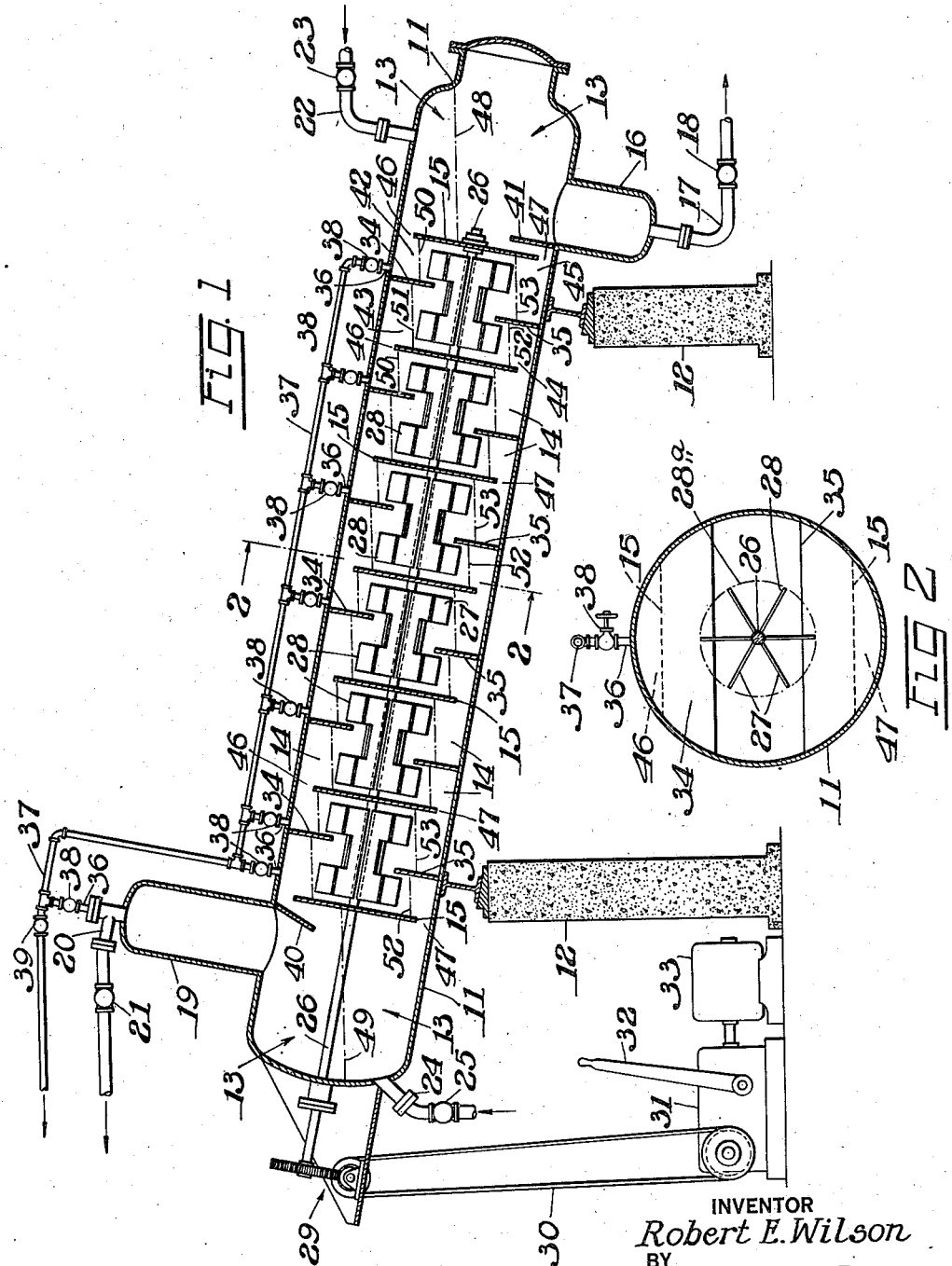
INVENTOR
Robert E. Wilson
BY
Bruce K. Brown
ATTORNEY Feb. 4, 1936.         R. E. WILSON         2,029,690
PROCESS AND APPARATUS FOR CONTACTING TWO LIQUIDS
Filed July 10, 1933    2 Sheets-Sheet 2

INVENTOR
Robert E. Wilson
BY
Bruce K. Brown
ATTORNEY

Patented Feb. 4, 1936

2,029,690

UNITED STATES PATENT OFFICE 2,029,690

PROCESS AND APPARATUS FOR CONTACTING TWO LIQUIDS

Robert E. Wilson, Chicago, Ill., assignor to Standard Oil Company, Chicago, Ill., a corporation of Indiana Application July 10, 1933, Serial No. 679,609

11 Claims. (Cl. 196—45)

This invention relates to process and apparatus for contacting two fluids, particularly two liquids. More particularly it relates to countercurrent extraction and apparatus therefor.

My co-pending application, Serial No. 645,533, filed December 3, 1932, shows a countercurrent contactor of the horizontal type having a plurality of compartments with baffles located within each compartment to prevent all but the most thoroughly contacted material from passing from one side of the compartment to the other. This arrangement, although a great advance over the prior art, has been found to be subject to some disadvantage in that the same degree of agitation is provided in both sides of the compartment whereas it is more desirable to cause thorough emulsification on one side and to permit the two liquids to separate on the other side, one of them passing on to the next compartment of the apparatus or next stage of the process. Another disadvantage in my prior process and apparatus was the tendency toward gas-lock caused by the accumulation of air and/or vapors in the upper portions of the various compartments. A further disadvantage lay in the fact that the apparatus was not tilted sufficiently to provide optimum results. A still further disadvantage was the tendency for at least one of the two liquids to rotate with the paddles to some extent and thus be "short-circuited" under the baffles.

It is an object of my present invention to overcome these and other disadvantages and more particularly to provide an apparatus in which the degree of agitation is varied at different points to meet the needs of the process as will be hereinafter described; in which freedom from gas-lock is insured; in which the apparatus is tilted at an optimum angle to the horizontal; and in which "short-circuiting" is prevented by improved baffle design. Another object is to provide a process utilizing this improved apparatus. Still other and more detailed objects of my invention will become apparent as the description thereof proceeds.

My invention will now be described in detail with reference to the preferred embodiment shown in the accompanying drawings in which:

Figure 1 is an elevation of my countercurrent contactor partly in section;

Figure 2 is a partial elevation taken along the line 2—2 of Figure 1; and

Figure 3:
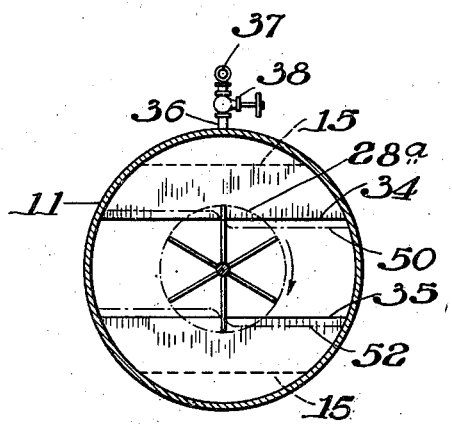

Figures 3, 4, 5, and 6 are partial elevations corresponding to Figure 2 but showing various modified baffle structures.

Referring now to the drawings in more detail a generally horizontal casing 11 rests on supports 12 and is divided into two end compartments 13 and a plurality of intermediate compartments 14 by means of baffles 15. I prefer to use from 3 to 7 intermediate compartments 14. Downwardly projecting extension 16 opens into the lower of end compartments 13 and is provided, preferably at the bottom, with a fluid outlet 17 equipped with valve 18. Similarly the upper of compartments 13 is provided with an upward extension 19 at the top of which is located a fluid outlet 20 provided with a valve 21. The lower end compartment 13 is also provided with a fluid inlet 22 equipped with valve 23 and the upper end compartment 13 is equipped with fluid inlet 24 which is provided in turn with valve 25. Inlet 22 is preferably, but not necessarily, located near the top of lower end compartment 13 and inlet 24 is preferably, but not necessarily, located near the bottom of upper end compartment 13.

Shaft 26 traverses all or part of compartments 13 and 14 and is preferably axially disposed with respect to casing 11. A paddle wheel 27 is carried by shaft 26 within at least some and preferably all of compartments 14. These paddle wheels are preferably composed of a plurality of generally U-shaped blades 28. Shaft 26 is provided with drive mechanism 29 connected by means of belt 30 with a variable speed reducer controlled by means of lever 32 and driven by motor 33.

Compartments 14 are provided with downwardly projecting baffles 34 which are preferably approximately perpendicularly disposed with respect to the axis of casing 11. Baffles 34 are located closer to one leg of the generally U-shaped blades than to the other and preferably very close to one of said legs. Compartments 14 are likewise provided with upwardly projecting baffles 35 which are preferably approximately perpendicularly disposed with respect to the axis of casing 11 and are preferably closer to that leg of blades 28 from which baffles 34 are furthest. In general, baffles 35 should be adjacent to the leg of the blade.

Casing 11 is provided with a plurality of gas vents 36 which are preferably located immediately on the downstream side of the various baffles 34 and above outlet 20. These gas vents are connected to manifold 37 by means of valves 38. Manifold 37 is also provided with a master valve 39.

Having described my countercurrent contacting apparatus, I will now proceed to outline the processes for which it is adapted and its functional advantages with respect to those processes. The apparatus can be utilized for the contacting of any two fluids but it is particularly adapted to contacting two liquids which are not completely miscible with each other under the prevailing operating conditions and which are substantially different in specific gravity.

The liquid of lower specific gravity is introduced through inlet 22 by means of valve 23 and flows through casing 11 along the upper part thereof past and around the various baffles 15 and 34, finally past baffle 40, up into extension 19 and out through outlet 20 and valve 21. Simultaneously a liquid of higher specific gravity is introduced through inlet 24 by means of valve 25 and flows along the bottom of casing 11, past the various baffles 15 and 35, finally past baffle 41 and into downward extension 16 and thence out of the apparatus through outlet 17 and valve 18.

While the two liquids are thus being flowed through the apparatus in countercurrent contact with each other, shaft 26 is rotated by means of motor 33, etc., at an optimum speed to be determined as hereinafter described. Blades 28 attached to shaft 26 are rotated thereby, their tips describing a circular path 28a. The rotation of these blades tends to produce emulsification between the two liquids. This is highly desirable since it insures complete contact and the attainment of equilibrium between the two liquids. Nevertheless, it is desirable that the emulsion after being formed be broken so that the unemulsified liquid can pass on to the next stage of the process and again undergo emulsification.

My invention makes this desirable result possible and in effect makes each one of compartments 14 a distinct stage wherein equilibrium is obtained and the two liquids pass on in opposite directions to the next stage.

This is accomplished most effectively by the hereinafter described location of baffles 34 and 35. Taking the right-hand one of compartments 14 as typical, it will be seen that baffle 34 divides the upper portion of the compartment into a relatively narrow zone 42 and a relatively wide zone 43, whereas baffle 35 divides the lower portion of the compartment 14 into a second relatively narrow zone 44 and a second relatively wide zone 45. Since zones 42 and 44 will receive much more agitation per unit volume than zones 43 and 45, the former will hereafter be referred to as vigorous agitation zones, whereas the latter will be referred to as relatively quiescent zones. The liquid of lower specific gravity enters one of compartments 14 through one of passages 46 located between one of baffles 15 and casing 11. Passage 46 leads directly into vigorous agitation zone 42, and the light liquid is thoroughly emulsified with the heavier one flowing along the bottom of the casing. Due to the difference in hydrostatic head this emulsified material gradually passes under baffle 34 and enters relatively quiescent zone 43. In this zone the light liquid settles out from the emulsion and passes through the next passage 46 to the next compartment wherein the process just described is repeated.

Simultaneously the heavy liquid enters this same compartment 14 through one of passages 47 located between the bottom of baffle 15 and casing 11, is vigorously agitated in vigorous agitation zone 44, is emulsified with the light liquid, passes over baffle 35 in emulsion with the light liquid, settles out in relatively quiescent zone 45, and passes on to the next compartment through the next passage 47.

Optimum results can be obtained by control of the rate of rotation of shaft 26, by control of valves 18, 21, 23, and 25, and if desired, by the use of an interfacial liquid level control (not shown) located in one or both of end compartments 13 cooperating with one or more of valves 18, 21, 23, and 25. In a preferred method an interfacial liquid level control is used in one of end compartments 13 in cooperation with a pressure control valve located in the outlet from the opposite end compartment.

Approximate preferred interfacial levels between each of the liquids and the emulsification zone are shown by dashed lines in Figure 1. It will be understood of course that these lines are only approximate since in many cases the emulsification zone will gradually taper off into the unemulsified liquid layer. In the lower end compartment 13, interfacial level 48 should be relatively high in order to permit the settling out of entrained light liquid from the heavy liquid being withdrawn through outlet 17. Similarly interfacial level 49 should be relatively low so as to permit the settling out of entrained heavy liquid from the light liquid being withdrawn from outlet 20. Level 49 must, in general, be above level 48 so that the hydrostatic head necessary to secure flow through the apparatus can be secured. Level 50 in compartment 42 represents the approximate interface between the light liquid and the emulsified material. This level should preferably meet baffle 15 near the top thereof. After flowing around baffle 34 into relatively quiescent zone 43 the level 51 between the light liquid and the emulsified material will be somewhat higher than level 50 due to the lower degree of agitation. Similar considerations apply to levels 52 and 53 representing the approximate interfaces between the heavier liquid and the emulsified material.

The provision of gas vents 36 is of great importance when contacting two liquids, since the accumulation of air vapors, etc. in the upper portions of the various compartments, particularly immediately on the downstream sides of baffles 34 will otherwise interfere seriously with the operation of the apparatus.

It is also a matter of considerable importance that the angle at which casing 11 is tilted to the horizontal be carefully selected. If this angle is too small the rate of flow through my apparatus will be very small and the aforementioned relationships between the various interfacial levels can not be obtained. On the other hand, there is an upper limit, angles larger than which cannot be used without sacrifice of efficiency or operability. I find that angles from about 5° to about 30° can be used although angles from about 8° to about 20° are preferable. The term "generally horizontal" applied herein to casing 11 covers angles from 0° to 20° or 30° to the horizontal.

While my process and apparatus can be used for contacting any two fluids and particularly for the contacting of any two non-miscible liquids differing substantially in specific gravity, it is peculiarly adapted to countercurrent extraction of petroleum fractions and more particularly lubricating oil stocks. In a preferred embodiment the material introduced through inlet 22 and withdrawn through outlet 20 is a lubricating oil stock, and the material introduced through inlet 24 and withdrawn through outlet 17 is a selective solvent such as dichlorethyl ether, sulfur dioxide, a mixture of sulfur dioxide and benzol, nitrobenzene, cresylic acid or phenol.

Baffles 34 and 35 as well as baffle 15 as shown in Figures 1 and 2 and as hereinbefore described are segmental baffles having approximately horizontal edges. This is theoretically correct and is practically desirable in many cases. I find, however, that if one or both of the liquids being contacted is highly viscous or if paddles 27 are rotated at high speeds a portion of the unemulsified material tends to rotate with the paddles with the result that (presuming clockwise rotation of paddles 27) a portion of the lighter liquid passes under the right ends of baffles 34 and/or a portion of the heavier liquid passes under the left ends of baffles 35. This I refer to as "short-circuiting" since it results in liquid passing through one or more of compartments 14 without undergoing emulsification thereby failing to reach equilibrium and preventing the efficient functioning of the various countercurrent stages.

For instance in contacting a viscous lubricating oil stock with dichlorethyl ether at paddle speeds sufficiently high to secure thorough emulsification, the unemulsified lubricating oil stock rotates to some extent with the paddles so that interfacial level 50 representing the boundary between the relatively emulsified layer and the relatively unemulsified lubricating oil stock on the upstream side of baffle 34 is displaced as shown in Figure 3, the right hand end of the interfacial level lying under the edge of baffle 34 and resulting in "short-circuiting". In this particular case, the dichlorethyl ether is of such low viscosity that the displacement effect on the lower layer is relatively unimportant but if the heavier liquid is viscous or the speed of rotation of paddles 27 is very great, interfacial level 52 on the upstream side of baffle 35 will also be displaced as shown in Figure 3.

Figure 4:
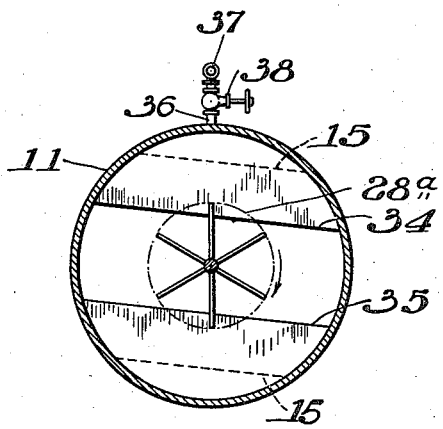

This short-circuiting can be prevented by placing baffles 34 and/or 35 out of line with the horizontal, the displacement being in the direction of rotation of paddles 27 as shown in Figure 4. The degree of displacement from the horizontal will depend on the viscosities of the two liquids, the speed of rotation of the paddles, etc. and need not be the same for baffles 35 as for baffles 34. Baffle 15 can be similarly displaced as shown in Figure 4 but this will not generally be necessary.

Figure 5:
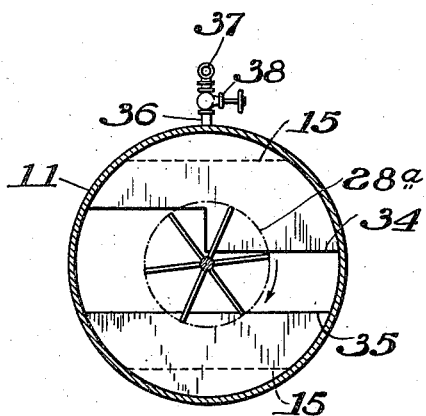

Figure 5 shows a modified form of corrected baffle 34. Instead of displacing the whole baffle in the direction of rotation of the paddles, the right edge of the baffle is made lower than the left edge so as to guard against interfacial level 50 extending below the edge of the baffle.

Figure 6:
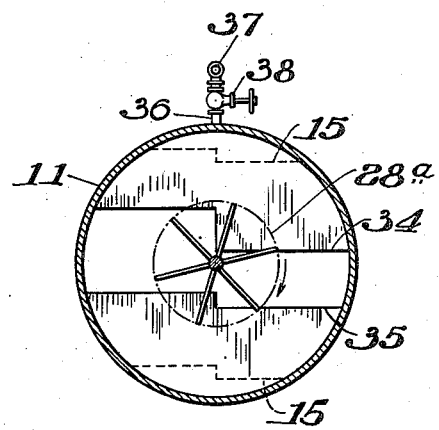

In Figure 6 a similar but lesser correction is made in baffle 35 and baffles 15 are also similarly modified.

While I have described my invention in connection with certain preferred embodiments thereof, I do not wish to be limited thereby but only to the scope of the appended claims in which I have set forth the novel features of my invention.

I claim:

1. An apparatus for the countercurrent contacting of two fluids in a plurality of stages comprising a compartment, baffles at the ends of said compartment, means for partially dividing said compartment into two pairs of zones, the zones of each pair being disposed diagonally opposite to each other, and means for vigorously agitating fluids within each zone of one of said pairs of zones without vigorously agitating fluids within either zone of the other of said pairs of zones.

2. An apparatus for countercurrent extraction comprising a generally horizontal casing, a plurality of generally perpendicular baffles dividing said casing into a plurality of compartments, passages connecting each two adjacent compartments near the tops thereof, passages for connecting each two adjacent compartments near the bottom thereof, a generally horizontal shaft traversing said compartments, means for rotating said shaft, a plurality of generally U-shaped agitation blades carried by said shaft within at least some of said compartments, the paths of the legs of said blades extending to a point short of said passages, a downwardly projecting baffle in each of said last-mentioned compartments located between the paths of the legs of one of said blades and close to the path of one leg of said blade, and an upwardly projecting baffle in each of said compartments located between the paths of the legs of one of said blades and close to the path of the other leg of said blade.

3. An apparatus for countercurrent extraction comprising a casing tilted at an angle of from about 5° to about 30° to the horizontal, a plurality of baffles approximately perpendicularly disposed to the axis of said casing and partially dividing said casing into two end compartments and at least three intermediate compartments, passages connecting adjacent compartments near the tops and bottoms thereof, fluid inlets to each of said end compartments, a downward extension of said casing communicating with the lower of said end compartments, a fluid outlet from said extension, an upward extension of said casing communicating with the upper of said end compartments, a fluid outlet from said last-mentioned extension, gas vents located at the tops of at least some of said compartments, a shaft traversing said compartments, means for rotating said shaft, means for controlling the rate of rotation of said shaft, a plurality of generally U-shaped blades carried by said shaft within at least some of said intermediate compartments, the paths of the legs of said generally U-shaped blades extending to a point short of said passages, a baffle projecting downwardly from said casing within each of said last-mentioned compartments located close to the path of one leg of said generally U-shaped blade, the edge of said last-mentioned baffle extending lower on the side toward which said blades rotate than on the side from which said blades rotate and a baffle projecting upwardly from said casing within each of said last-mentioned compartments located close to the path of the other leg of said generally U-shaped blade, the edge of said last-mentioned baffle extending higher on the side toward which said blades rotate than on the side from which said blades rotate.

4. An apparatus for countercurrent extraction comprising a generally horizontal casing, a plurality of baffles partially dividing said casing into two end compartments and at least three intermediate compartments, passages connecting adjacent compartments near the tops thereof, passages connecting adjacent compartments near the bottoms thereof, fluid inlets to each of said end compartments, fluid outlets from each of said end compartments, rotary agitation means located within at least some of said intermediate compartments, baffles projecting from the top of said casing into at least some of said intermediate compartments, the edges of said last-mentioned baffles extending lower on the side toward which said means rotate than on the side from which said means rotate, and baffles projecting from the bottom of said casing into at least some of said intermediate compartments, the edges of said last-mentioned baffles extending higher on the side toward which said means rotate than on the side from which said means rotate.

5. An apparatus for countercurrent extraction comprising a generally horizontal casing, a plurality of baffles partially dividing said casing into two end compartments and at least three intermediate compartments, passages connecting adjacent compartments near the tops and bottoms thereof, fluid inlets to each of said end compartments, fluid outlets from each of said end compartments, rotary agitation means located within at least some of said intermediate compartments and baffles projecting from the bottom of said casing into at least some of said intermediate compartments, the edges of said last-mentioned baffles extending higher on the side toward which said means rotate than on the side from which said means rotate.

6. An apparatus for countercurrent extraction comprising a generally horizontal casing, a plurality of baffles partially dividing said casing into two end compartments and at least three intermediate compartments, passages connecting adjacent compartments near the tops and bottoms thereof, fluid inlets to each of said end compartments, fluid outlets from each of said end compartments, rotary agitation means located within at least some of said intermediate compartments and baffles projecting from the top of said casing into at least some of said intermediate compartments, the edges of said last-mentioned baffles extending lower on the side toward which said means rotate than on the side from which said means rotate.

7. A process for contacting a liquid with a second liquid not completely miscible with said first-mentioned liquid and having a specific gravity substantially different from that of said first-mentioned liquid, which comprises flowing said first-mentioned liquid in succession through a vigorous agitation zone and a relatively quiescent zone while in contact with said second liquid and simultaneously flowing said second liquid in a direction opposed to the direction of flow of said first-mentioned liquid in succession through a second vigorous agitation zone while in unrestricted contact with said first-mentioned liquid in said first-mentioned relatively quiescent zone and then through a second relatively quiescent zone while in unrestricted contact with said first-mentioned liquid in said first-mentioned vigorous agitation zone.

8. An apparatus according to claim 5 in which said casing is tilted at an angle of from about 5° to about 30° to the horizontal.

9. An apparatus according to claim 6 in which said casing is tilted at an angle of from about 5° to about 30° to the horizontal.

10. An apparatus according to claim 5 in which said intermediate compartments are provided with gas vents at their tops.

11. An apparatus according to claim 6 in which said intermediate compartments are provided with gas vents at their tops.

ROBERT E. WILSON.